(12) United States Patent
Beck et al.

(10) Patent No.: US 11,270,364 B1
(45) Date of Patent: *Mar. 8, 2022

(54) CONSOLIDATION OF PRODUCT DATA MODELS

(71) Applicant: VERSATA DEVELOPMENT GROUP, INC., Austin, TX (US)

(72) Inventors: Brandon M. Beck, Austin, TX (US); Shawn A. P. Smith, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,277

(22) Filed: Jun. 24, 2019

Related U.S. Application Data

(63) Continuation of application No. 12/768,121, filed on Apr. 27, 2010, now Pat. No. 10,360,612, which is a continuation of application No. 10/827,078, filed on Apr. 19, 2004, now Pat. No. 7,739,080.

(51) Int. Cl.
| | |
|---|---|
| *G06Q 30/06* | (2012.01) |
| *G06Q 10/06* | (2012.01) |
| *G06F 30/00* | (2020.01) |
| *G06T 17/00* | (2006.01) |
| *G06F 30/3323* | (2020.01) |
| *G06F 111/04* | (2020.01) |

(52) U.S. Cl.
CPC ......... *G06Q 30/0621* (2013.01); *G06F 30/00* (2020.01); *G06Q 10/063* (2013.01); *G06F 30/3323* (2020.01); *G06F 2111/04* (2020.01); *G06Q 10/06* (2013.01); *G06T 17/005* (2013.01); *Y02P 90/02* (2015.11)

(58) Field of Classification Search
CPC .. G06Q 30/0621; G06Q 10/063; G06Q 10/06; G06F 30/00; G06F 30/3323; G06F 2111/04; G06T 17/005; Y02P 90/265
See application file for complete search history.

(56) References Cited

U.S. PATENT DOCUMENTS

2008/0196027 A1* 8/2008 Hohmann ............. G06F 3/0649
718/100

OTHER PUBLICATIONS

Notice of Allowance dated Mar. 22, 2019, filed in U.S. Appl. No. 12/768,121, pp. 1-7.

(Continued)

*Primary Examiner* — Saif A Alhija
(74) *Attorney, Agent, or Firm* — Kent B. Chambers; Terrile, Cannatti & Chambers, LLP

(57) ABSTRACT

A model consolidation process combines multiple configuration models into a single unified configuration model that contains the union of the allowable combinations (i.e. combinations that are buildable) from each of the original models. An aspect of at least one embodiment of the model consolidation process is that it allows models to be combined in such a way that any incompatibilities or contradictions between models are detected and automatically resolved where possible. If an incompatibility is detected that cannot be automatically resolved, then the configuration models should not be combined. Instead if this incompatibility case occurs, at least one embodiment of the model consolidation process produces a description of the problem encountered and report the problem along with the necessary information required for a human to resolve it.

19 Claims, 13 Drawing Sheets

(56) References Cited

OTHER PUBLICATIONS

Response to Non-Final Office Action dated Nov. 5, 2018, filed in U.S. Appl. No. 12/768,121, pp. 8-32.
Non-Final Rejection dated May 3, 2018, filed in U.S. Appl. No. 12/768,121, pp. 33-50.
Request for Continued Examination dated Mar. 26, 2018, filed in U.S. Appl. No. 12/768,121, pp. 51-76.
Advisory Action dated Mar. 15, 2018, filed in U.S. Appl. No. 12/768,121, pp. 77-81.
Response to Final Office Action dated Feb. 26, 2018, filed in U.S. Appl. No. 12/768,121, pp. 82-103.
Final Rejection dated Sep. 25, 2017, filed in U.S. Appl. No. 12/768,121, pp. 104-114.
Applicant Summary of Interview with Examiner dated Jul. 10, 2017, filed in U.S. Appl. No. 12/768,121, p. 115.
Applicant Initiated Interview Summary dated Jul. 6, 2017, filed in U.S. Appl. No. 12/768,121, pp. 116-118.
Applicant Initiated Interview Request From dated Jun. 27, 2017, filed in U.S. Appl. No. 12/768,121, p. 119.
Response to Non-Final Office Action dated Jun. 8, 2017, filed in U.S. Appl. No. 12/768,121, pp. 120-138.
Non-Final Rejection dated Feb. 8, 2017, filed in U.S. Appl. No. 12/768,121, pp. 139-148.
Request for Continued Examination dated Dec. 23, 2016, filed in U.S. Appl. No. 12/768,121, pp. 149-151.
Response to Amendment Under Rule 312 dated Nov. 21, 2016, filed in U.S. Appl. No. 12/768,121, pp. 152-153.
Amendment after Notice of Allowance (Rule 312) dated Nov. 15, 2016, filed in U.S. Appl. No. 12/768,121, pp. 154-155.
Notice of Allowance dated Oct. 18, 2016, filed in U.S. Appl. No. 12/768,121, pp. 156-164.
Response to Non-Final Office Action dated Jul. 26, 2016, filed in U.S. Appl. No. 12/768,121, pp. 165-187.
Non-Final Rejection dated Feb. 1, 2016, filed in U.S. Appl. No. 12/768,121, pp. 188-213.
Request for Continued Examination dated Oct. 29, 2015, filed in U.S. Appl. No. 12/768,121, pp. 214-237.
Advisory Action dated Oct. 16, 2015, filed in U.S. Appl. No. 12/768,121, pp. 238-240.
Response to Final Office Action dated Sep. 29, 2015, filed in U.S. Appl. No. 12/768,121, pp. 1-21.
Final Rejection dated Apr. 29, 2015, filed in U.S. Appl. No. 12/768,121, pp. 22-42.
Response to Non-Final Office Action dated Jan. 8, 2015, filed in U.S. Appl. No. 12/768,121, pp. 43-60.
Non-Final Rejection dated Sep. 8, 2014, filed in U.S. Appl. No. 12/768,121, pp. 61-77.
Request for Continued Examination dated Jul. 3, 2014, filed in U.S. Appl. No. 12/768,121, pp. 78-94.
Final Rejection dated Jan. 3, 2014, filed in U.S. Appl. No. 12/768,121, pp. 95-106.
Response to Non-Final Office Action dated Oct. 28, 2013, filed in U.S. Appl. No. 12/768,121, pp. 107-113.
Non-Final Rejection dated May 28, 2013, filed in U.S. Appl. No. 12/768,121, pp. 114-126.
Request for Continued Examination dated Feb. 21, 2012, filed in U.S. Appl. No. 12/768,121, pp. 127-136.
Final Rejection dated Aug. 18, 2011, filed in U.S. Appl. No. 12/768,121, pp. 137-148.
Response to Non-Final Office Action dated Jun. 9, 2011, filed in U.S. Appl. No. 12/768,121, pp. 149-162.
Non-Final Rejection dated Dec. 9, 2010, filed in U.S. Appl. No. 12/768,121, pp. 163-171.
Applicant Response to Pre-Exam Formalities Notice dated Aug. 11, 2010, filed in U.S. Appl. No. 12/768,121, pp. 172-174.

* cited by examiner

DAG for model 622

DAG for models 602 and 612

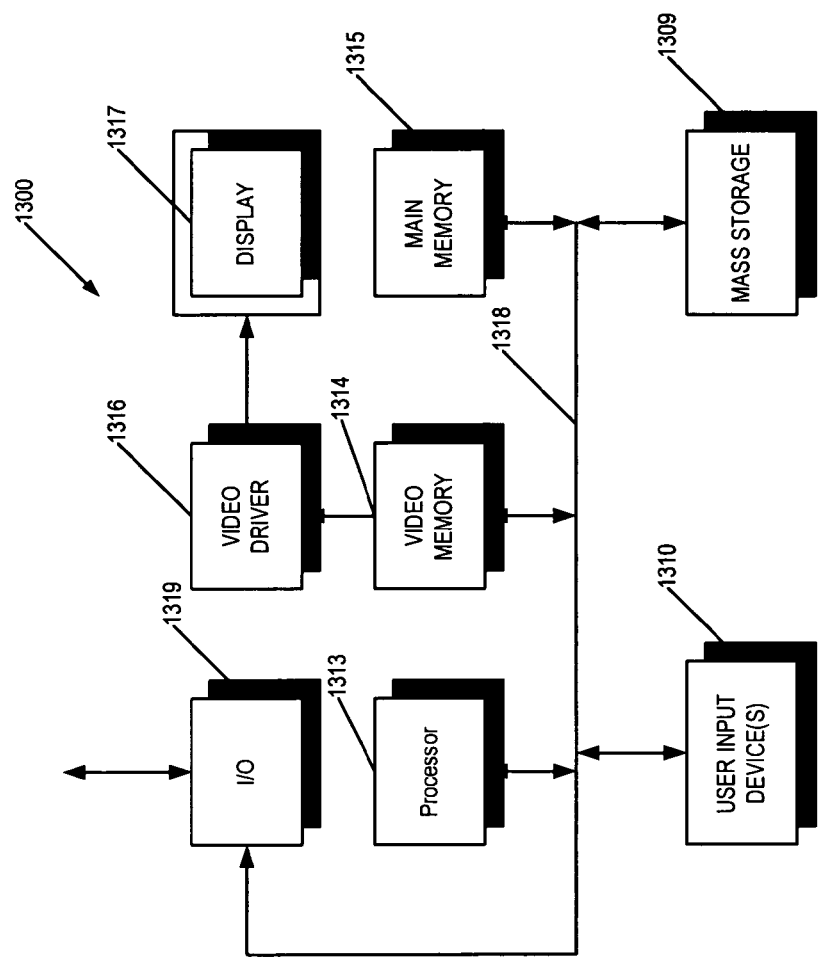

CONSOLIDATION OF PRODUCT DATA MODELS

BACKGROUND OF THE INVENTION

Field of the Invention

The present invention relates in general to the field of information processing, and more specifically to a system and method for consolidating data from various product data models.

Description of the Related Art

A configurable product can be described by a configuration model having a set of configuration rules. A configurable product can be conceptually broken down into sets of selectable families and features of families that make up each product. A family represents a classification of a particular type of feature. Families are typically classified as groups of features with the same functional purpose. Example families for an automobile are "engines," "tires," "seats," and "exterior paint color." Families can also represent other groups such as market areas. For example, a family can include a marketing region such as USA, Canada, Mexico, Europe, or any other region. Families can be represented in terms of the minimum and maximum number of features that must be present in a configuration from a family for the configuration to be valid. A common family minimum and maximum or "(min, max)" is (1, 1). This notation means that exactly one feature from the family must be part of a configuration for the configuration to be valid. Other common (min, max) settings are (0, 1), meaning that either no features or a single feature from the family must be present in a configuration for it to be valid, and (0, −1), meaning that zero or any positive number of features from the family must be present in a configuration for it to be valid.

A feature represents an option that can be ordered on a product. All features are members of a family. Features are both assigned optionalities and used to qualify other features and the optionalities assigned to them. An example feature from the engine family is a "4.8 liter V8." Features relate to each other via ordering codes or optionalities. Example optionalities include "S", "O", "M", and "N," which translate to standard, optional, mandatory, and not available. A specific example would be "the 4.8 liter V8 engine is standard on the GS trim."

Features relate to each other via configuration rules. A rule can be characterized as generally including a 'left hand side', (LHS), a 'right hand side' (RHS), and a specified relationship between the LHS and RHS. Each LHS feature may be associated with one or more RHS features, which indicates that a single feature in the LHS may be constrained or otherwise qualified by one or more RHS features. The RHS describes when a rule is in effect and what features are particularly affected. For example, a rule with a RHS of "XA, XB" means that the rule is in effect in cases where you have at least XA and XB in a buildable configuration, and XA and XB are features particularly affected by the rule along with the LHS feature. Configuration rules include optionalities that define a relationship between the LHS and RHS. Further exemplary discussion of LHS and RHS rule concepts is described in Gupta et al., U.S. Pat. No. 5,825,651 entitled "Method and Apparatus for Maintaining and Configuring Systems."

A configuration rule includes a main feature, an optionality, one or more constraints, and an applicable timeframe. As an example:

| Main feature | Optionality | Constraints | Timeframe | |
|---|---|---|---|---|
| 4.8 liter V8 | S | XL & US | May-December 2003 | Rule 1 |

Rule 1 means "the 4.8 liter V8 is standard with the XL trim and US market from May to December 2003." The main feature represents the feature that is being affected by the rule. Optionalities can be positive or negative: positive optionalities state that the main feature can work with the constraints; negative optionalities state the main feature cannot work with the constraints. Constraints qualify the rule and can be an arbitrary Boolean expression of features such as AND, NOT, and OR operators. In the rules below, a "." indicates an AND operation, a "~" indicates a NOT operation, and a "+" indicates an OR operation. The timeframe specifies when the other rule elements are effective.

A buildable configuration describes what features can and can't exist with other features of a product. The example rule above defines a buildable configuration in the following way: "the 4.8 liter V8 is buildable (because it is standard) with the combination of XL and US." If the combination of features, such as of XL and US, is not buildable, the example rule is inactive. Consequently, even though the engine is buildable with that combination, if the combination is not buildable, the three features together are not a buildable configuration. A rule that would make the example rule inactive is the following:

| Main feature | Optionality | Constraints | Timeframe | |
|---|---|---|---|---|
| XL | N | US | September 2002 | Rule 2 |

Rule 2 means "the XL trim main feature is not available with US from September of 2002 onward." Until the XL main feature is made available with the US by changing the optionality from "N" to one that expresses a positive relationship, there will not be a buildable configuration for XL, US, and the 4.8 L engine.

Thus, a rule defines a buildable configuration between its main feature and its constraints only. A rule does NOT define a buildable configuration relationship between the members of its constraints. A separate rule must define that buildable configuration. Consequently, all rules together for a product define the complete product buildable configurations. In order to determine if the three features in the example rule (the main feature and the constraints) are a buildable configuration, the rules written on each of those features (i.e. where each feature is the main feature) should to be considered jointly. Inactive rules do not define buildable configurations until they become active.

A "model" refers to a collection of rules that define the buildable configurations of one or more products.

Referring to FIG. 2, the families in each model are internally organized in accordance with a directed acyclic graph ("DAG") 200. The DAG contains an edge between a child family and a parent family if there exists a rule with a LHS feature that belongs to the child family and a RHS feature that belongs to the parent family. The DAG organization allows a child family to reference an ancestor but not the other way around. Cyclic references within a model as in FIG. 4 can produce ambiguities within the model.

Each model contains variations of the buildable configurations of the product. For example, a company may market a product with a particular set of standard features in one region and market the same product with a different set of standard features in another region. For example, in an automotive context, a V6 engine may be standard for a particular automobile model in one country, and a V8 engine may be standard for the particular automobile model in another country. In a computer context, a power supply with a 110V input may be standard in one country and a power supply with a 220V input may be standard in another country.

Defining and maintaining the configuration space for a large product can often be difficult to do in a single configuration model. In order to limit the complexity and facilitate maintenance the configuration space is often defined in multiple configuration models. Each of these models are then assigned a set of defining constraints that specify which portion of the overall configuration space for the product it is defining. An example breakdown of the configuration space definition for an automotive vehicle could be into 3 separate models. Each model would define the configuration space of the automobile in one of 3 countries: USA, Canada, or Mexico. In this example each configuration model would have as a defining constraint one of the features representing each country. In the USA model the only allowable configurations would all contain the "USA" feature. Although not specifically included in this example, time can also be a defining constraint.

A model may contain labels that describe the time period and space over which the model applies (also referred to as "model defining constraints"). For example, a model which describes the availability of cars in the United States during the years 2004 to 2006 may have defining constraints of "CARS.USA.2004-2006" while a model that describes the availability of all vehicles in North America during 2005 may have defining constraints of "{CARS+TRUCKS}.{USA+CANADA+MEXICO}.2005".

While it is convenient to have this logical separation of the configuration space for maintenance purposes it is often desired to provide a single unified model that represents the configuration space for the entire product. The resulting unified configuration model can then be used to answer any questions that one of the original models could answer and it will give the same result. The set of allowable feature combinations for the unified model should be equivalent to the union of allowable feature combinations for each of the original configuration models.

Thus, despite the differences in various models, it is often desirable to combine the multiple models into a consolidated model having a unified set of rules (also referred to as "stitched rules"). Referring to FIG. 5, the conventional consolidation system 500 includes a model 502 that represents a set of three models that may be created and maintained separately. Model 504 is, for example, a configuration model that describes how a particular product may be built and sold for the USA market. Model 506 is a configuration model that describes how the same product may be built and sold for the Canadian market. Model 508 is a configuration model that describes how the same product may be built and sold for the Mexican market. Models 504, 506, and 508 may be combined into a single model 512 by conventional consolidation (also referred to as "stitching") processes 510. The consolidated model 512 will contain stitched rules that represent all the information present in the original three models. However, in many circumstances the conventional consolidation processes 510 produce unspecified configuration buildables in consolidated model 512. "Unspecified configuration buildables" are configuration buildables included in consolidated model 512 that are not defined in any of the source models, i.e. models 504, 506, and 508. An unspecified configuration buildable is, thus, an error that can have significant adverse consequences. Conventional consolidation processes do not automatically detect unspecified configuration buildables and correct them. Since models can contain thousands, hundreds of thousands, or more rules, a high degree of automation is often a key to success for modeling and model data driven technologies.

Referring to FIG. 1, for example, assume models 102 and 104 are two configuration models with the following rules:
Model 102: model defining constraints={MKT1}
MKT1 O ALL
ENG1 S ALL
Model 104: model defining constraints={MKT2}
MKT2 O ALL
ENG1 S ALL
ENG2 O ALL The rules in models 102 and 104 are interpreted as allowing the following buildable configurations:
Model 102:
MKT1.ENG1
Model 104:
MKT2.ENG1
MKT2.ENG2

An example conventional consolidation process 510 that simply combined the rules from models 102 and 104 using a simple aggregation process would yield a consolidated model 106 with the following rules:
Model 106: model defining constraints ("MDC")= {MKT1+MKT2}
MKT1 O ALL
MKT2 O ALL
ENG1 S ALL
ENG2 O ALL The rules of model 106 are interpreted as allowing the following buildable configurations:
Model 106:
  MKT1.ENG1 (corresponds to element 108)
  MKT1.ENG2 (corresponds to element 112)
  MKT2.ENG1 (corresponds to element 110)
  MKT2.ENG2 (corresponds to element 110)

Model 106 includes the model space defined by the model defining constraints 108 of model 102 and the model space defined by the model defining constraints of 110 of model 104. Unfortunately, in addition to representing the stitched rules of models 102 and 104, model 106 also includes an unspecified buildable configuration "MKT1.ENG2" 112. In the embodiment of FIG. 1, buildable configurations of model 104 have been extended into the model defining constraints MKT1 space 114. Model defining constraints space MKT2 space 116 accurately contains only the buildable configurations of model 104.

The consolidated model should faithfully represent the buildable configurations of the products represented by models 102 and 104 without including any errors such as the unspecified buildable configurations 112. Conventional consolidation processes attempt to solve this problem by modifying, adding, and removing stitched rules so that rules from each source model do not extend outside of the space defined by their source model's defining constraints.

An example enhanced conventional consolidation process 510 that combined the rules from models 102 and 104, constraining each to their source model's defining constraints, would yield a consolidated model 406 with the following rules:

Model 406: model defining constraints={MKT1+MKT2}
MKT1 O ALL (source model 102's defining constraints={MKT1})
ENG1 S MKT1 (source model 102's defining constraints={MKT1})
MKT2 O ALL (source model 104's defining constraints={MKT2})
ENG1 S MKT2 (source model 104's defining constraints={MKT2})
ENG2 O MKT2 (source model 104's defining constraints={MKT2})

The rules of model 406 are interpreted as allowing the following buildable configurations:

Model 406:
MKT1.ENG1
MKT2.ENG1
MKT2.ENG2

The new model 406 accurately combines the intent of source models 102 and 104 without introducing new unspecified buildable combinations.

Although consolidation appears to be the straight forward process of adding all the rules from each model being consolidated and qualifying each rule with the model defining constraint label that indicates the origin of the rule in a consolidated model, the actual conventional process is not that simple due to constraints on the model's representation of families. To avoid creation of ambiguous models, the consolidation process typically must also ensure that the families in the consolidated model 512 can be organized into a DAG as described above. However, the conventional consolidation process 510 violates this constraint.

Following is pseudo code for a conventional consolidation process produced using an appropriately programmed computer and model data. The "//" forward slash symbols represent the start and end of explanatory comments:

def performConventionalStitching(rules, mdc, dag):
    //Defines the method "performConventionalStitching" to consolidate one or more models using the rules in the models, the model defining constraints (mdc), and the DAG of the model.//
    stitchedRules=
    //collects the consolidated rules for the consolidated model.//
    for each rule in rules:
    //Sequentially process each rule in the models being consolidated.//
    stitchedRule=rule.intersect(mdc)
        //Intersect the rule being processed with a model qualifier space, i.e. the configurations for which the model applies. Intersection Examples wherein A1, B1, and B2 represent model qualifier spaces:
        (X1 S A1)∩A1=X1 S A1
        (X1 S A1)∩B1=X1 S A1.B1
        (X1 S B2)∩B1=∅
        (B1 S ALL)∩B1=B1 S ALL
        (B2 S ALL)∩B1=∅
        (A1 S ALL)∩A1·B2=A1 S B2//
    if(stitchedRule!=∅):
        //If the intersection is not empty . . . //
    stitchedRule=removeDAGCycles(stitchedRule, dag)
        //Remove any qualifiers that produce cyclical references within the DAG.//
    stitchedRules.add(stitchedRule)
        //Add stitched rules to the set of stitchedRules of the consolidated model.//
    return stitchedRules def removeDAGCycles(rule, dag):
    //Defines the method "removeDAGCycles" to remove qualifiers of the rule that produce cyclical relationships within the DAG.//
    remove qualifiers from the rule that are ancestor families of the main feature (i.e. the LHS of the rule) in the DAG.

The following represents the example application of the conventional model consolidation process. Consider two source models using the following rules:

Model 602: model defining constraints={SER1}
MKT1 O ALL, MKT2 O ALL
ENG1 S MKT1, ENG2 S MKT2, ENG2 O MKT1
SER1 S {ENG1+ENG2}
Model 612: model defining constraints={SER2}
MKT1 O ALL, MKT2 O ALL
ENG1 S MKT1, ENG2 S MKT2
SER2 S (ENG1+ENG2)

FIG. 6 illustrates how the rules for each family combine to yield a set of buildable configurations. In addition, FIG. 6 illustrates how conventional stitching combines the buildable combinations of models 602 and 612 to create the consolidated model 622. Shaded portions represent indicated buildable configurations. For clarity, FIG. 6 ignores the effects of the optionalities ('S', 'O', . . . ) of the rules. FIG. 3 illustrates a DAG for models 602 and 612.

Model 602: model defining constraints={SER1}
    The MKT rules restrict the model to buildable combinations 604: all buildable combinations that include MKT1 and MKT2.
    The ENG rules restrict the model to buildable combinations 606: all buildable combinations that include MKT1.ENG1, MKT1.ENG2, MKT2. ENG2.
    The SER rule restricts the model to buildable combinations 608: all buildable combinations that include SER2.
    The intersection of the buildable combinations allowed by MKT (604), ENG (606) and SER (608) are the buildable combinations allowed by the entire model (610): all buildable combinations that include MKT1.ENG1.SER1, MKT1.ENG2.SER1, MKT2.ENG2.SER1.
Model 612: model defining constraints={SER2}
    The MKT rules restrict the model to buildable combinations 614: all buildable combinations that include MKT1 and MKT 2.
    The ENG rules restrict the model to buildable combinations 616: all buildable combinations that include MKT1.ENG1, MKT2.ENG2.
    The SER rule restricts the model to buildable combinations 618: all buildable combinations that include SER2.
    The intersection of the buildable combinations allowed by MKT (614), ENG (616) and SER (618) are the buildable combinations allowed by the entire model (620): all buildable combinations that include MKT1.ENG1.SER2, MKT2.ENG2.SER2.

Following are the consolidated model rules generated using conventional consolidation process 510 and above pseudo code:

Model 622: model defining constraints={SER1+SER2}
MKT1 O ALL, MKT2 O ALL
MKT1 O ALL, MKT2 O ALL (624)
ENG1 S MKT1, ENG2 S MKT2, ENG2 O MKT1

ENG1 S MKT1, ENG2 S MKT2 (626)
SER1 S {ENG1+ENG2}
SER2 S {ENG1+ENG2} (628)

The MKT and ENG rules could not be qualified by the model defining constraints because doing so would have caused a cycle in the family relationship DAG as depicted in FIG. 4. Especially, the "ENG2 O MKT1" rule was not qualified by the model defining constraint SER1. The result is that the unspecified buildable configuration "MKT1.ENG2.SER2" 636 was added to the buildable combinations 630 of the combined model 622.

SUMMARY OF THE INVENTION

A model consolidation process combines multiple configuration models into a single unified configuration model that contains the union of the allowable combinations (i.e. combinations that are buildable) from each of the original models. An aspect of at least one embodiment of the model consolidation process is that it allows models to be combined in such a way that any incompatibilities or contradictions between models are detected and automatically resolved where possible. If an incompatibility is detected that cannot be automatically resolved, then the configuration models should not be combined. Instead if this incompatibility case occurs, at least one embodiment of the model consolidation process produces a description of the problem encountered and reports the problem along with the necessary information required for a human to resolve it.

One embodiment of the present invention includes a method of consolidating multiple models, wherein each model comprises only rules that define a non-cyclic chain of dependencies among families and features of families and include at least one rule having a constraint that references a non-ancestral family to the constraint. The method includes combining the models into a single, consolidated model that maintains the non-cyclic chain of dependencies among families and features of families.

Another embodiment of the present invention includes a system for consolidating multiple models, wherein each model comprises only rules that define a non-cyclic chain of dependencies among families and features of families and include at least one rule having a constraint that references a non-ancestral family to the constraint. The system includes a model consolidation module to combine the models into a single, consolidated model that maintains the non-cyclic chain of dependencies among families and features of families.

BRIEF DESCRIPTION OF THE DRAWINGS

The present invention may be better understood, and its numerous objects, features and advantages made apparent to those skilled in the art by referencing the accompanying drawings. The use of the same reference number throughout the several Figures designates a like or similar element.

FIG. 13 depicts a computer system with which a modeling consolidation system can be implemented.

DETAILED DESCRIPTION

The term "product" is used herein to generically refer to tangible products, such as systems, as well as intangible products, such as services.

Contrary to conventional processes, the rules from individual models should not simply be qualified by the defining constraints for that model and then directly combined together. The first reason for this is because it is possible that one of the original models will make a statement that contradicts a statement in one of the other models. If two contradicting statements were present in the unified configuration model then an inference procedure run on it would never be able to draw a logical conclusion. Secondly, each configuration model defines a non-cyclic chain of dependencies among its families and features of families. The problem with conventional stitching algorithms can occur, for example, whenever model defining constraints reference families that have DAG ancestors and the DAG ancestors are not referenced by model defining constraints. In this instance, the DAG is a union of all family relationships across all models. Thus, if the defining constraint features are ancestral features and are added to the RHS of every rule in the model as with conventional consolidation processes, a cycle would be introduced into this chain of dependencies. In order to avoid introducing these cycles and still combine the individual models together into a consolidated model, an intelligent algorithm is required.

A model consolidation process, such as model consolidation process 710, represents a process for combining multiple configuration models into a single unified configuration model that contains the union of the allowable combinations (i.e. combinations that are buildable) from each of the original models. An aspect of at least one embodiment of the model consolidation process is that it allows models to be combined in such a way that any incompatibilities or contradictions between models are detected and automatically resolved where possible. If an incompatibility is detected that cannot be automatically resolved, then the configuration models should not be combined. Instead if this incompatibility case occurs, at least one embodiment of the model consolidation process produces a description of the problem encountered and report the problem along with the necessary information required for a human to resolve it.

Figure 7:
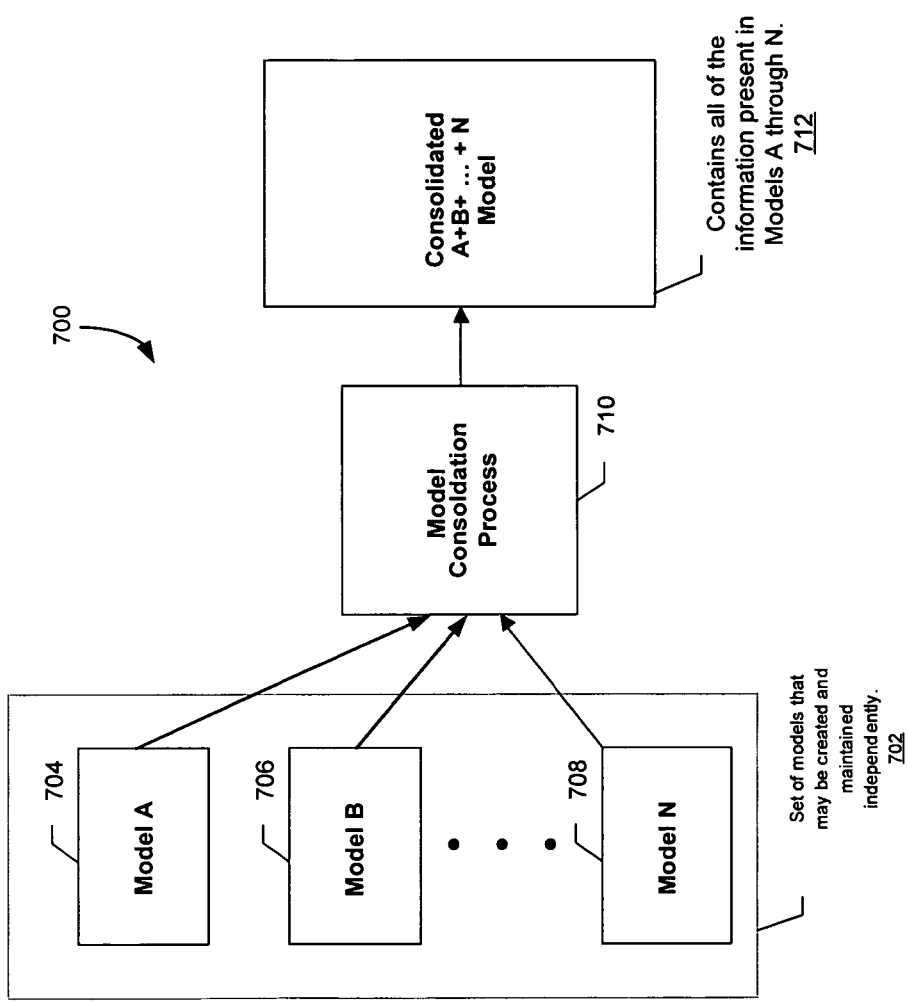
FIG. 7 depicts a model consolidation system.

Referring to FIG. 7, the model consolidation system 700 includes model 702, which represents a set of N models that may be created and maintained separately, where N is any integer. Model A 704 is, for example, a configuration model that describes how a particular product may be built and sold for the USA market. Model B 706 is a configuration model that, for example, describes how the same product may be built and sold for the Canadian market. Model N 708 is, for example, a configuration model that describes how the same product may be built and sold for the Mexican market. Models 704, 706, and 708 may be combined into a single model 712 by the model consolidation (also referred to as "stitching") process 710. The combined model 712 contains stitched rules that represent all the information present in the original three models without unspecified buildable configurations.

Figure 6:
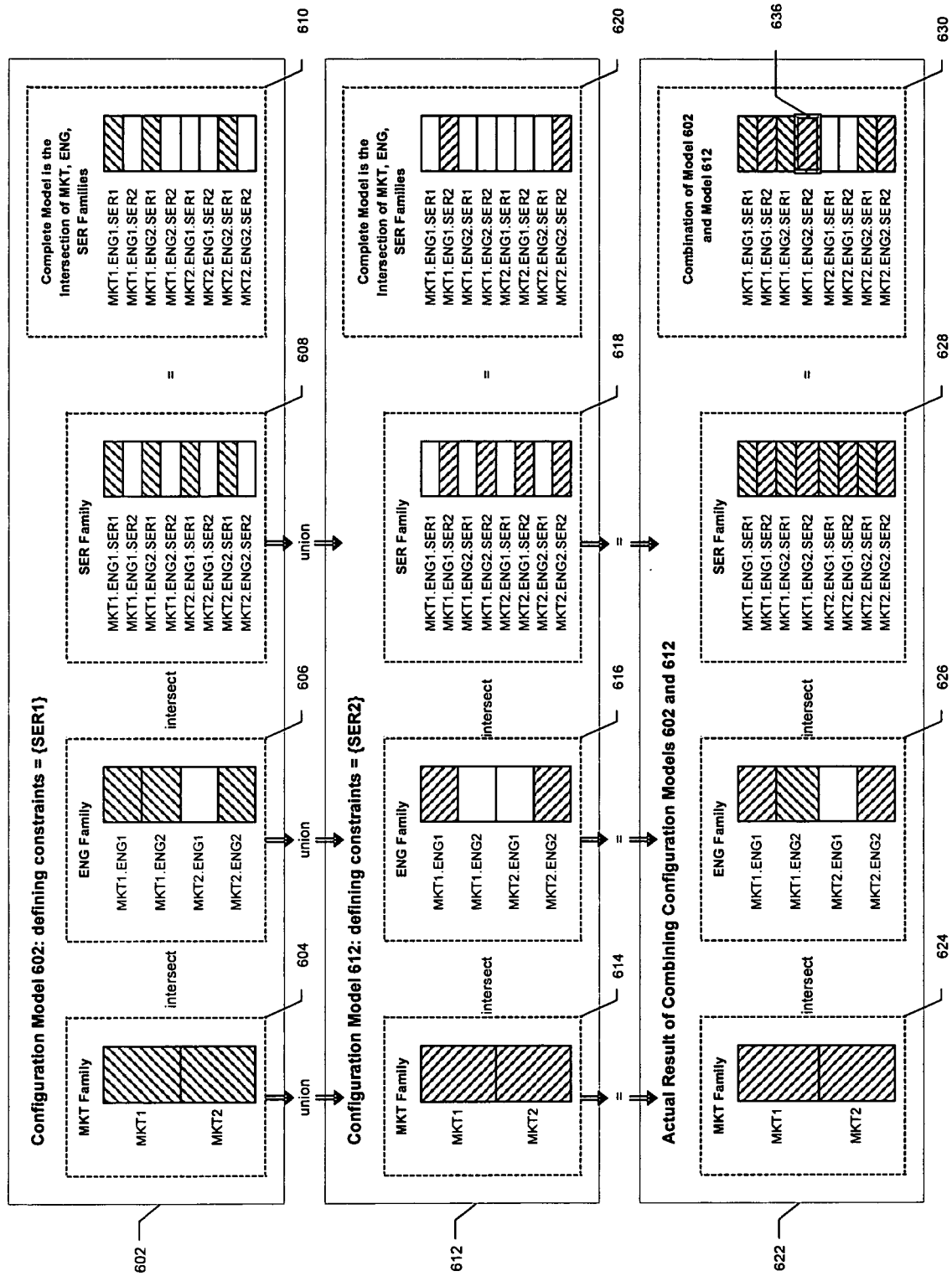
FIG. 6 (prior art) depicts combining rules of two models into a consolidated model having specified and unspecified buildable configurations.
Figure 8:
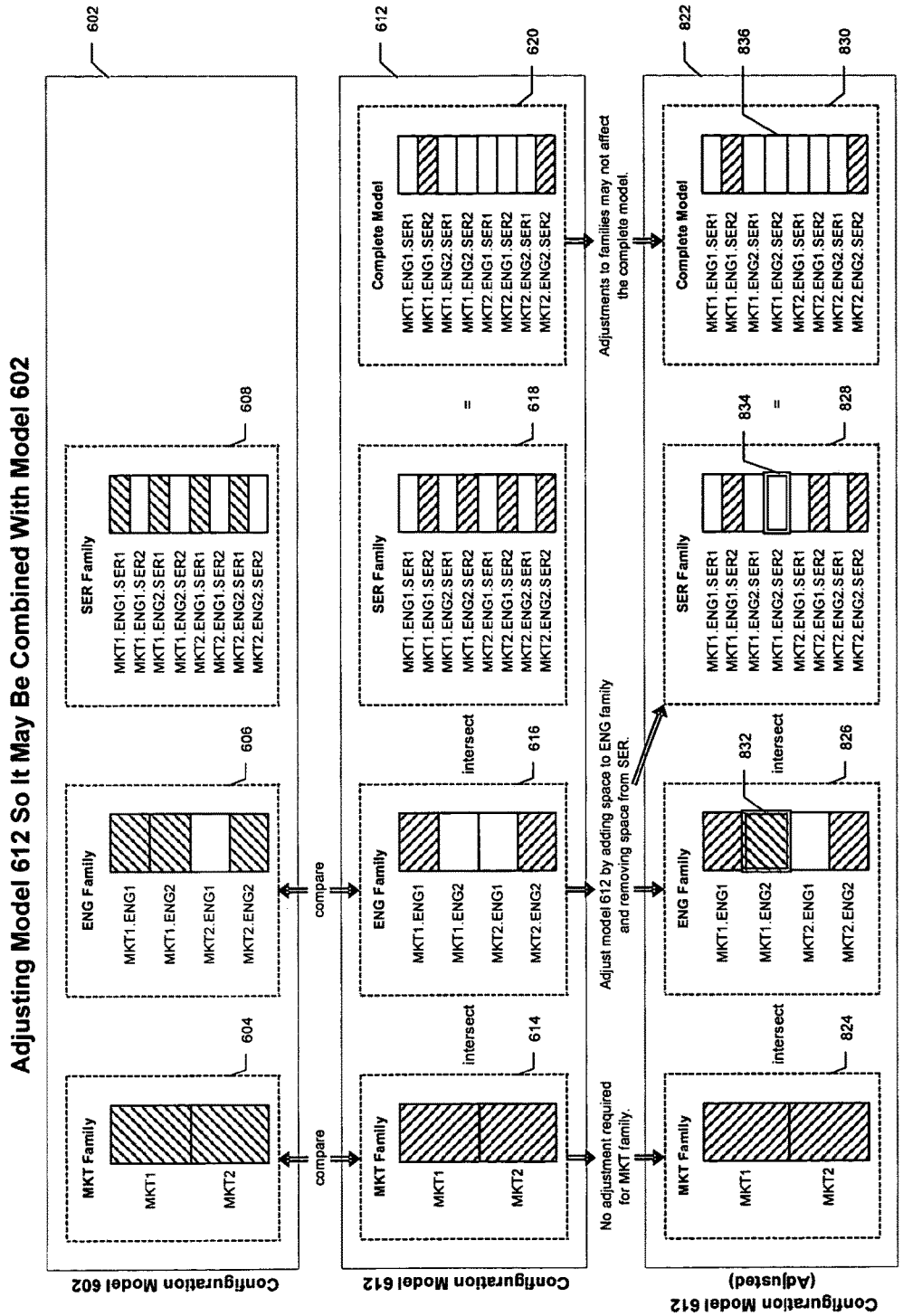
FIG. 8 depicts the model representations used for FIG. 6 and the consolidation thereof using an embodiment of the model consolidation system of FIG. 6.

FIGS. 8 and 9 depicts depict the model representations used for FIGS. 6 and 7 and the resulting consolidation of the model representations using an embodiment of model consolidation system 700. For clarity, FIGS. 8 and 9 ignore the effects of the optionalities ('S', 'O', . . . ) of the rules.

There is a conflict between the two models on ENG: MKT1.ENG2 is released in Model 602 but not Model 612. Referring to block 832, because the ENG family is above Model 612's defining constraint family (SER) in the DAG, we may not adjust the ENG family by intersecting its space with Model 612's defining constraint (SER2). Instead, extend the ENG family in Model 612 to be compatible with the release of the ENG family in Model 602. Referring to block 834, the extension is compensated for by restricting the SER family so that it is no longer released in the space we extended the ENG family (MKT1.ENG2.*). Referring to block 836, the result is that the restriction on the SER family interacts with the extension of the ENG family in such a way that the consolidated model 822 does not include unspecified buildable configurations and, thus, faithfully represents the buildable configurations of models 602 and 612.

The desired result of obtaining a complete model is obtained by computing the following set:

(Complete Model Space for Model 602 intersect Model 602 defining constraints (SER1)) union (Complete Model Space for Model 612 intersect Model 612 defining constraints (SER2))

In this example the complete model spaces for both models do not extend outside their defining constraints, so this simplifies to the following expression:

Complete Model Space for Model 602 union Complete Model Space for Model 612

Figure 9A:
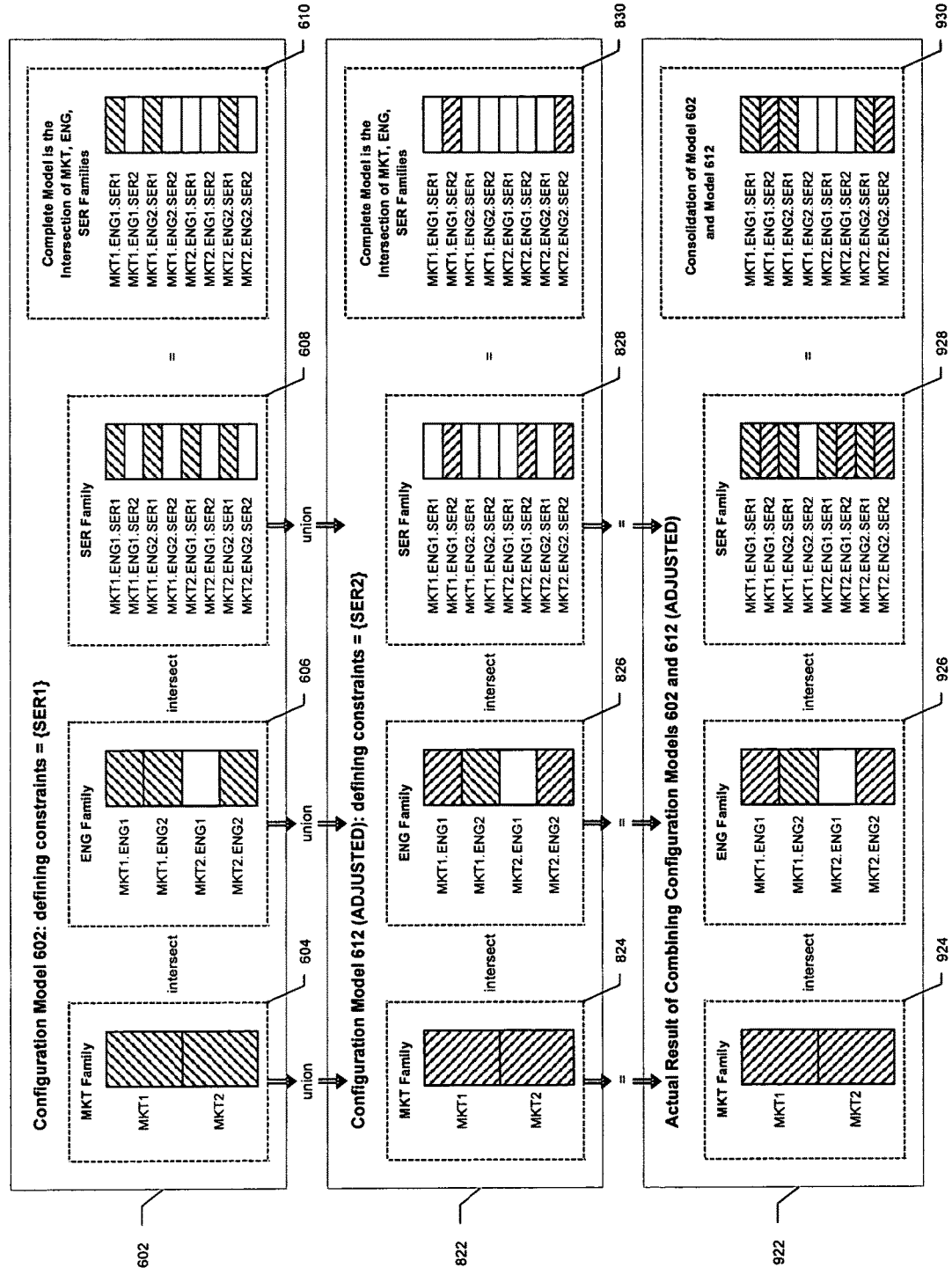
FIG. 9A depicts combining configuration models into an accurate consolidation model using the model consolidation system of FIG. 7.

FIG. 9A depicts the accurate results of combining configuration models 602 and 612 using model consolidation system 700. Blocks 924, 926, and 928 respectively represent the union of the MKT families, ENG families, and SER families from configuration models 602 and 612. Consolidated model 930 represents the accurate consolidation of models 602 and 612 having only specified configuration buildables. An embodiment of the consolidation process used to generated consolidated model 930 is described in more detail below.

Figure 9B:
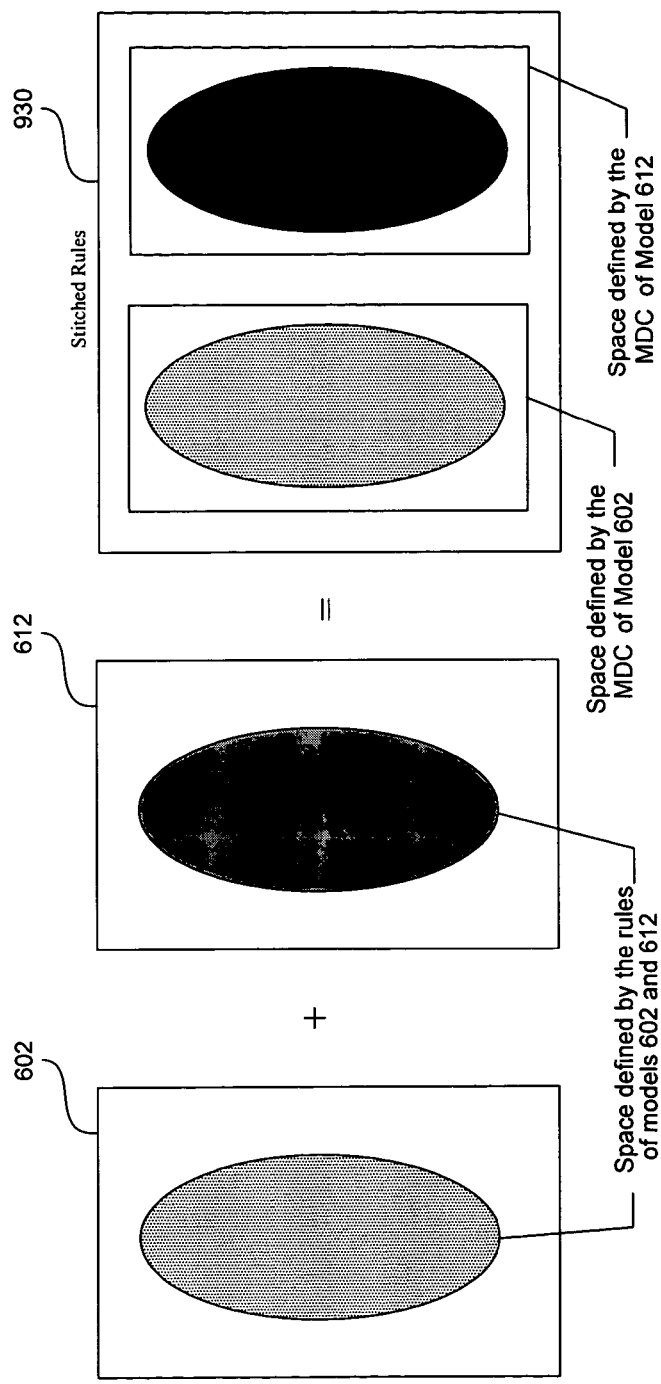
FIG. 9B depicts a graphical representation of the combination of models into consolidated model.

FIG. 9B depicts a graphical representation of the combination of models 602 and 612 into consolidated model 930.

Inputs

The input to the model consolidation process 710 is a set of configuration models 702 to be combined into one consolidated model 712 along with a set of defining constraints for each of models 702. The inputted set of configuration models contains compatible relationships such that the union of the models forms a DAG.

Outputs

In at least one embodiment, model consolidation process 710 produces one of two primary outputs in the form of consolidated model 712. One of these outputs is generated for each invocation of the model consolidation process 710.

The first possible output is a set of rules, represented by the consolidated model 712, that allows exactly those combinations of features that were allowed by one of the inputted configuration models 702.

The second output is a set of errors that generally cannot be fixed automatically and require human intervention. These errors can be used to direct a human to the set(s) of rules in the input models 702 that are conflicting with each other.

Data Structures

At least one embodiment of the model consolidation process 710 uses two key data structures.

1. A directed acyclic graph (DAG). Used to represent the hierarchical relationship between the families in a configuration model or set of rules.
2. A rule.

Process

Figure 10:
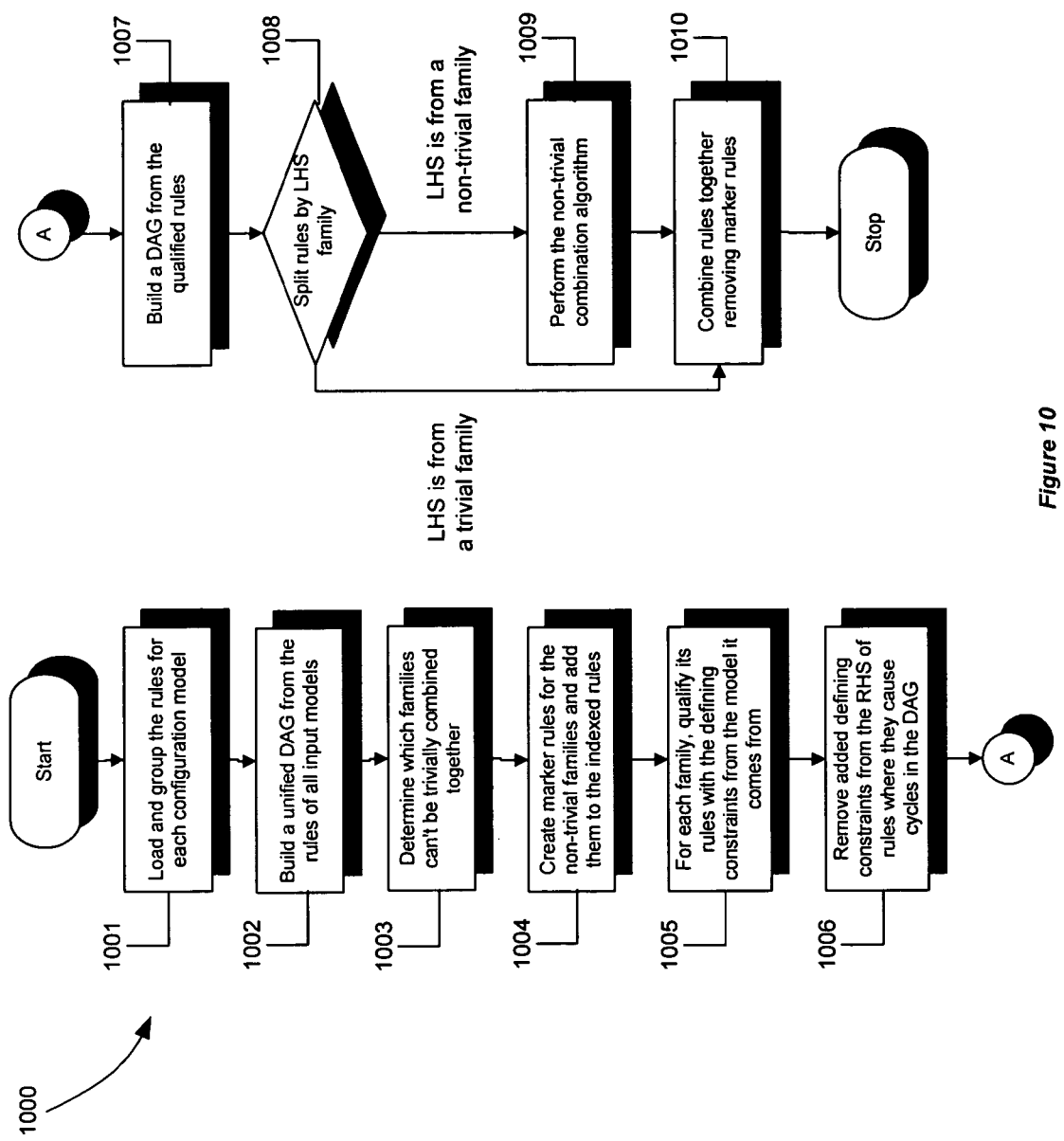
FIG. 10 depicts a flowchart of a model consolidation process 1000.

FIG. 10 depicts a flowchart of model consolidation process 1000, which represents one embodiment of model consolidation process.

Step 1 (1001): Load and group the rules for each configuration model

The rules from each of configuration models 702 are loaded into model configuration process 710 and grouped by the associated configuration models 702 from which they originated. This provides the ability to enumerate all rules for a particular configuration model as well as the ability to determine which configuration model a specific rule belongs to (i.e. "is associated with").

Step 2 (1002): Construct a DAG from all of the rules across models

A family DAG is then constructed from all of the rules of configuration models 702. This provides the ability to determine the relationships among families in configuration models 702. In particular this allows the ancestors of a family to be determined to prevent cyclic relationships in the DAG of consolidated model 712.

Step 3 (1003): Determine which families cannot be trivially combined together Non-trivial families that cannot be trivially combined are the families of the defining constraints as well as their ancestors. Trivial families can be combined using a stitching process such as the conventional stitching process 510. The DAG created in Step 2 is utilized to determine the ancestors of each of the families of the defining constraints. Each set of ancestor families is then combined together along with the set of families of the defining constraints. This results in the set of families that cannot be trivially combined.

Step 4 (1004): Create marker rules for the non-trivial families and add them to the mapping of rules Marker rules are created to define which portions of the overall configuration space for which a configuration model does not provide a buildable configuration (i.e. the "uncovered space"). These marker rules should look like any other rule in a configuration model with the exception of their optionality.

The uncovered space for a particular family in a configuration model can be calculated using a temporary rule. A temporary rule is created with a RHS representing ALL. Both the RHS and LHS of each rule in the family are then subtracted from this temporary rule. This subtraction could result in multiple rules. If this happens, then all remaining rules are subtracted from all temporary rules. Once this subtraction is complete the remaining set of rules describes the uncovered space for the particular family. Each of these remaining rules is processed, and any features on the RHS from the family being processed are moved to the LHS. This modified rule is now a marker rule and is added to the grouping of rules created during Step 1.

Step 5 (1005): For each family, qualify its rules with the defining constraints from the model that it comes from A preliminary pass is made of the rules to attempt to constrain the statements they make to fall within the space of the defining features of the configuration model they come from. This is done by creating a temporary rule with a RHS that is equivalent to the defining constraint features of the model being processed. All rules from that model are then intersected with this temporary rule and if the result is non-empty the intersection is kept. This intersection adds to the RHS of the rules the defining constraints of the model to which the rule belongs.

Step 6 (1006): Remove the added defining constraint features from the RHS of rules where they cause cycles in the DAG.

When the defining constraint features of each configuration model were added to the rules in Step 5, it is possible that cyclic relationships among the families of the rules were introduced. In order to remedy this, any defining constraint features on the RHS of a rule that introduces a cycle are removed.

For each rule the features of the RHS that belong to defining families are investigated. The ancestors of each RHS feature are computed, and if the family of the LHS feature of the rule is in the ancestor list, then that RHS feature is causing a cyclical relationship in the DAG and is removed from the RHS of the rule. Otherwise, the DAG is updated to include the relationship just encountered. Once this process is completed it is guaranteed that there are no cyclical relationships among the rules.

Step 7 (1007): Optionally, build a DAG from the qualified rules to ensure that no cycles are present.

Now that the rules have been updated with the defining constraint features, and there are no cyclical relationships in them, an updated DAG is created. This DAG is created in the same manner as the one created in Step 2.

Step 8 (1008): Split the rules into those with a LHS feature from a trivial family and those with a LHS feature from a non-trivial family The rules that have a LHS feature that belong to a trivial family are finished processing, however the rules with a LHS feature that belongs to a non-trivial family still should have more processing. Because of this, the rules are split into two groups, those with a LHS feature from a non-trivial family and those with a LHS feature from a trivial family.

Step 9 (1009): Perform the non-trivial combination algorithm

Figure 11:
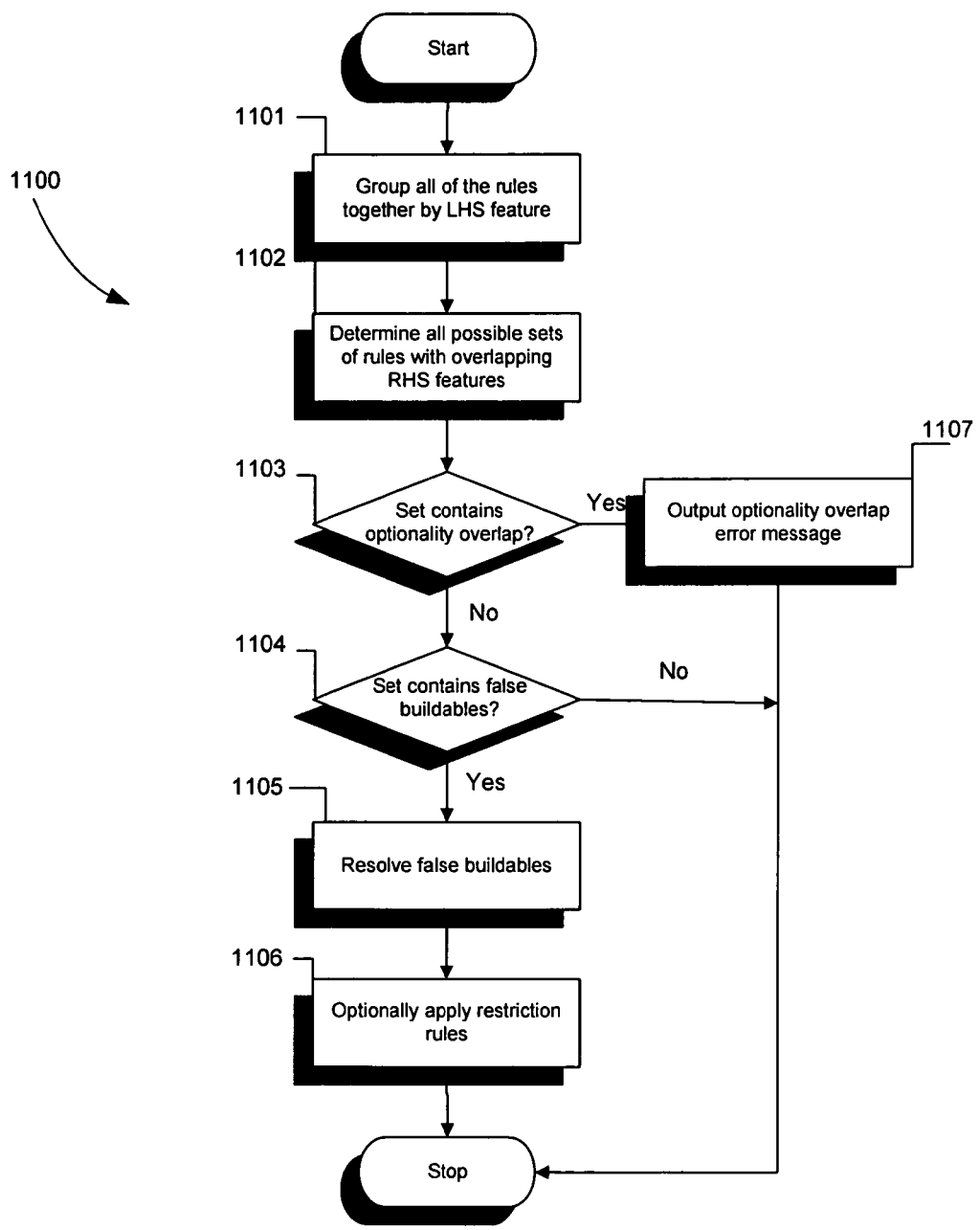
FIG. 11 depicts a flowchart for removing unspecified buildable configurations from a consolidated model.

This step and its associated sub-steps are only run on the rules with LHS features from a non-trivial family. This step updates the rules in such a way that any erroneous allowed feature combinations created by the combination process 1000 are removed. FIG. 11 shows a flowchart of process 1100, which depicts a flowchart for removing unspecified buildable configurations from a consolidated model.

Step 9.1 (1101): Group all of the rules together by LHS feature

All of the non-trivial rules are combined together and grouped together by LHS feature. This is done in a similar manner as the grouping performed in Step 1.

Step 9.2 (1102): Determine all possible sets of rules with overlapping RHS features The rules for each LHS feature are grouped together in all possible overlapping combinations. In one embodiment, this is done by creating a set containing all of the rules for a LHS feature and computing the power set of this set. Each element of the power set is investigated to see if all of the rules the element contains overlap each other, if they do and there are rules from at least two source models, then this set of rules is kept, otherwise it is discarded. Additionally any sets that are a subset of a non-discarded set are also removed. Those of ordinary skill in the art will recognize that many other ways exist to locate overlapping rule sets, such as indexing the rules in a data structure and searching for the overlapping rule sets.

Step 9.3 (1103): Check for optionality overlap

The non-marker rules in each non-discarded set of rules from Step 9.2 are then investigated to see if any of them have different optionalities. If there are rules in the same set with different optionalities that are non-marker rules, then incompatible optionality overlap has been detected. An error message is logged (1107) describing which rules have different optionalities, the space that they overlap, and which configuration models the rules came from.

Step 9.4 (1104): Check for unspecified buildables

Each non-discarded set of rules from Step 9.2 is investigated to see if it contains both marker rules and non-marker rules. If it does, then an unspecified buildable has been detected in this set of rules. If this situation happens, the unspecified buildable can be automatically removed in Step 9.5.

Step 9.5 (1105): Resolve unspecified buildables.

In order to repair the unspecified buildable configuration in a set of rules, a restriction rule preventing the erroneous, unspecified buildable configuration must be written.

The marker rules created in Step 4 are used to determine which restriction rules should be written. A restriction rule will be written for each marker rule in the set. The LHS feature of the restriction rule is the distinguishing constraint of the model from which the marker rule comes. The distinguishing constraint is the model defining constraint feature(s) of a model such that the distinguishing constraint and all of the DAG's ancestors in the MDC are sufficient to distinguish the MDC space of the model from the MDC spaces of the other models. The RHS features of the restriction rule are the set of features that describe where the overlap among this set of rules occurs. In other words it is the intersection of the rules in the set. The resulting restriction rule is then intersected with the same temporary rule from Step 5 for the model that the marker rule came from. If the result is non-empty then it is kept.

This process allows a rule from one model to extend into another at a non-trivial family, but repairs the extension at a family below the non-trivial family. This process is illustrated in elements 616, 826 and 828.

Step 9.6 (1106): Optionally apply restriction rules

If the output of the model consolidation process 710 is desired to not contain any generated restriction rules, then the restriction rules generated in Step 9.5 can be applied to the non-restriction rules in the set they were generated from. The restrictions can be applied by subtracting them from all other rules that have the same LHS features.

Step 10 (1010): Combine rules together removing marker rules

All of the rules whose LHS feature is from a trivial family are combined together with the rules whose LHS features are from non-trivial families. Additionally all restriction rules that were generated in Step 9.5 are also added if Step 9.6 was not executed to apply them to the non-restriction rules. Finally, all marker rules are removed.

EXAMPLE

The following is an example of the model combination algorithm performed on two configuration models. This example serves to illustrate a case where the two models cannot be combined together using the conventional stitching process and instead the more advanced combination process 1000 is used instead.
Inputs:
Family/Feature definitions:
MKT={MKT1, MKT2}
ENG={ENG1, ENG2}
SER={SER1, SER2}
Configuration model #1: defining constraints={SER1}
MKT1 O ALL
MKT2 O ALL
ENG1 S MKT1
ENG2 S MKT2
ENG2 O MKT1
SER1 S ENG1+ENG2
Configuration model #2: defining constraints={SER2}
MKT1 O ALL
MKT2 O ALL
ENG1 S MKT1
ENG2 S MKT2
SER2 S ENG1+ENG2
Step 1 (1001): Load and group the rules for each configuration model
Model #1:
MKT1 O ALL,
MKT2 O ALL,
ENG1 S MKT1,
ENG2 S MKT2,
ENG2 O MKT1,
SER1 S ENG1+ENG2
Model #2:
MKT1 O ALL,
MKT2 O ALL,
ENG1 S MKT1,
ENG2 S MKT2,
SER2 S ENG1+ENG2
Step 2 (1002): Construct a DAG from all of the rules across models The DAG constructed is presented as an adjacency list. The interpretation is that it is a mapping of a family to its parent families.

Figure 1:
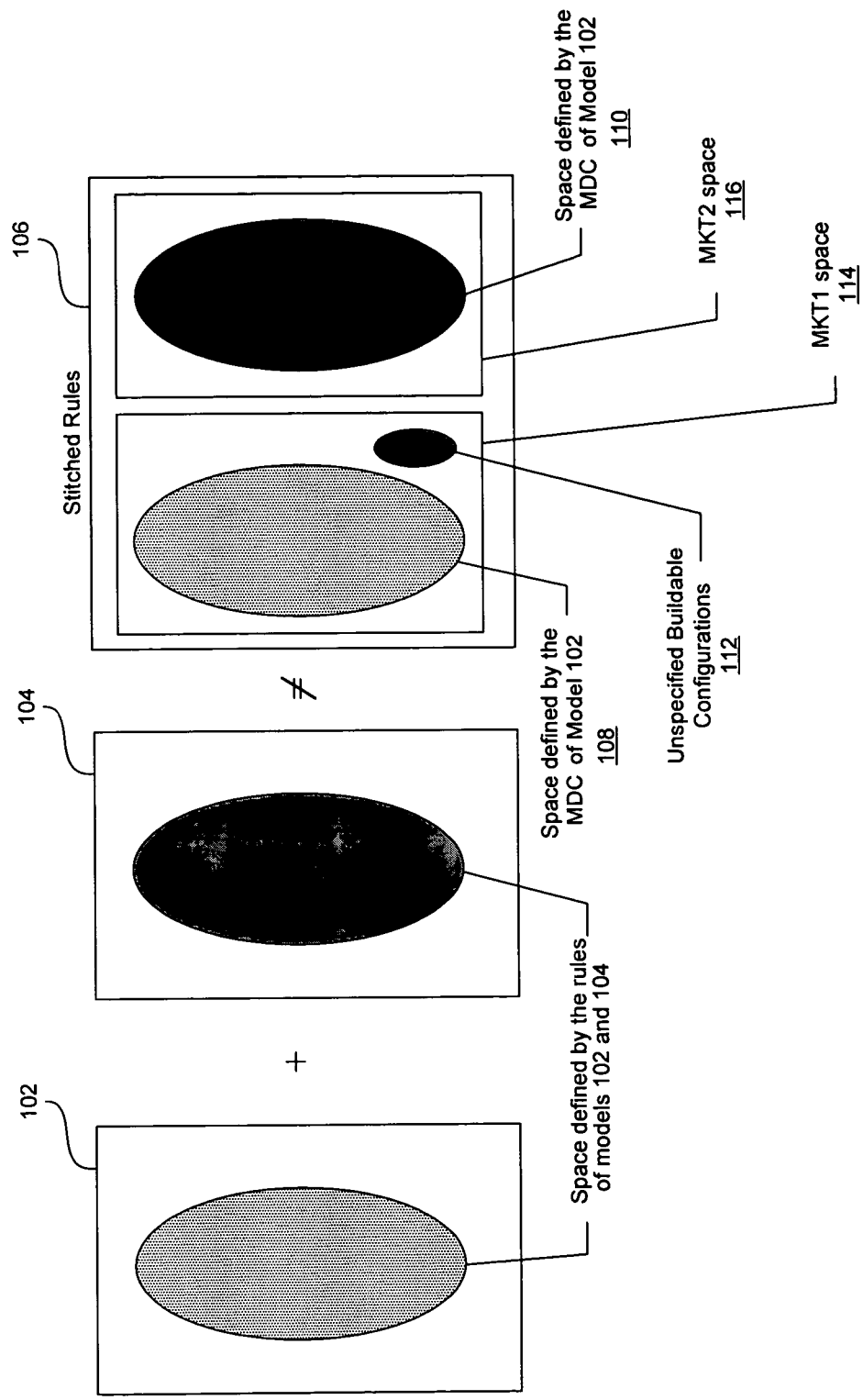
FIG. 1 (prior art) depicts a combination of models that generates unspecified buildable configurations.
Figure 2:
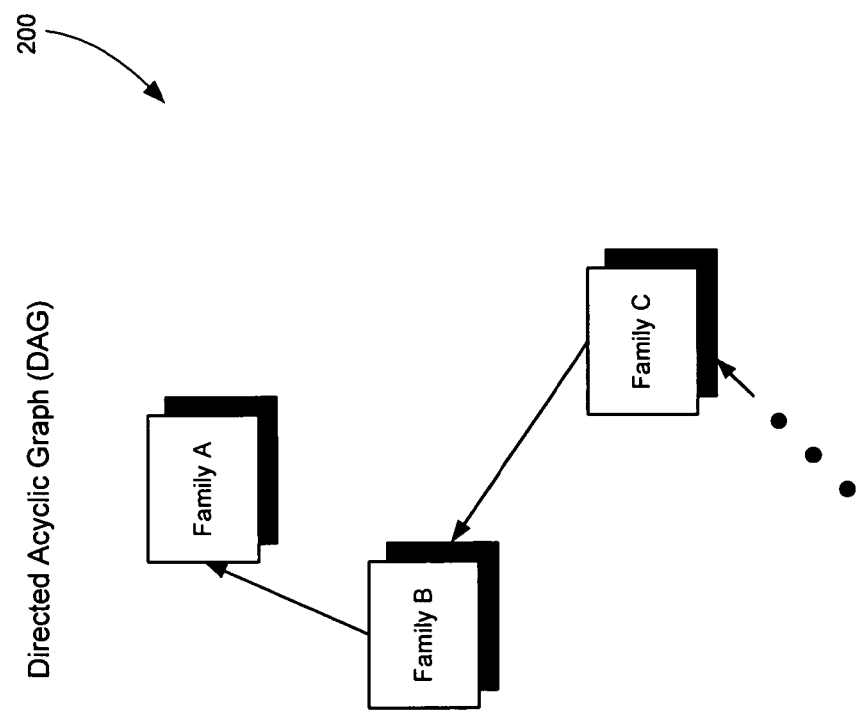
FIG. 2 (prior art) depicts a directed acyclic graph ("DAG").
Figure 4:
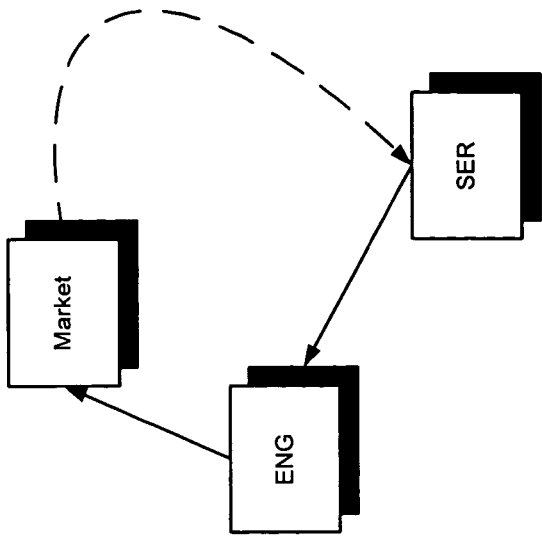
FIG. 4 (prior art) depicts a DAG with a cycle for a model representing the consolidation of models in FIG. 6 obtained using a conventional consolidation process.
Figure 3:
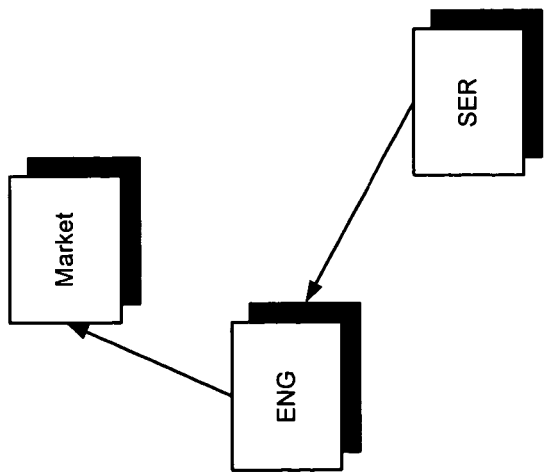
FIG. 3 (prior art) depicts a DAG for models depicted in FIG. 6.
Figure 5:
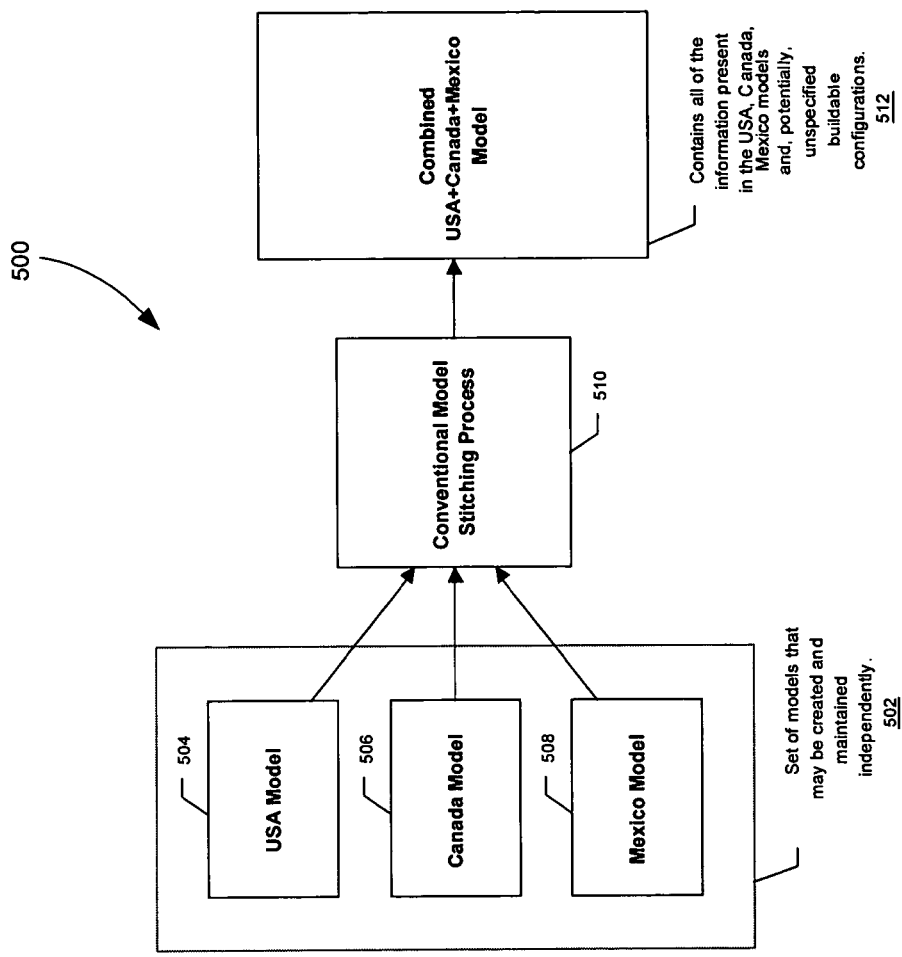
FIG. 5 (prior art) depicts a conventional consolidation system.

The following nomenclature represents a DAG as depicted in FIG. 3:
MKT →[ ]
ENG →[MKT]
SER →[ENG]
Step 3 (1003): Determine which families cannot be trivially combined together In this example there is only one constraint family, SER. Thus, it and its ancestors are the set of families that cannot be trivially combined together. This results in {MKT, ENG, SER} as the set of non-trivial families.

Step 4 (1004): Create Marker Rules for the Non-Trivial Families and Add them to the Mapping of Rules A temporary rule is constructed for each non-trivial family with ALL as the qualifiers. All other rules in the family are then subtracted from the temporary rules with an optionality of "x" resulting in the rules shown below:
Model #1:
MKT: [ ]
ENG: ALL x ENG1.MKT2
SER: ALL x SER2.(ENG1+ENG2)
Model #2:
MKT: [ ]
ENG: ALL x ENG1.MKT2, ALL x ENG2.MKT1
SER: ALL x SER1.(ENG1+ENG2)

In this example, the optionality N has been chosen for the marker rules. The appropriate RHS feature is moved to the LHS in the temporary rules and the optionality is changed to N. After this, the generated marker rules are as follows:
Model #1:
ENG1 N MKT2
SER2 N ENG1+ENG2
Model #2:
ENG1 N MKT2
ENG2 N MKT1
SER1 N ENG1+ENG2

These marker rules are then added to the grouping of rules from Step 1 to yield the following grouping:
Model #1:
MKT1 O ALL,
MKT2 O ALL,
ENG1 S MKT1,
ENG1 N MKT2,
ENG2 S MKT2,
ENG2 O MKT1,
SER1 S ENG1+ENG2,
SER2 N ENG1+ENG2
Model #2:
MKT1 O ALL,
MKT2 O ALL,
ENG1 S MKT1,
ENG1 N MKT2,
ENG2 N MKT1,
ENG2 S MKT2,
SER1 N ENG1+ENG2,
SER2 S ENG1+ENG2
Step 5 (1005): For Each Family, Qualify its Rules with the Defining Constraints from the Model that it Comes from In this example, since SER1 is the defining constraint of Model #1, a temporary rule with SER1 on the RHS will be created and all of the rules from Model #1 are intersected with it. Similarly, Model #2 will have a temporary rule with SER2 on the RHS and all of its rules will be intersected with it. After the rule intersections, the qualified rules will look like:
Model #1:
MKT1 O SER1,
MKT2 O SER1,
ENG1 S MKT1.SER1,
ENG1 N MKT2.SER1,
ENG2 S MKT2.SER1,
ENG2 O MKT. SER1,
SER1 S (ENG1+ENG2).SER1
Model #2:
MKT1 O SER2,
MKT2 O SER2,
ENG1 S MKT1.SER2,
ENG1 N MKT2.SER2,

ENG2 N MKT1.SER2,
ENG2 S MKT2.SER2,
SER2 S (ENG1+ENG2). SER2

Step 6 (1006): Remove the Added Defining Constraint Features from the RHS of Rules where they Cause Cycles in the DAG Since the SER family is a leaf in the DAG generated during Step 2, it cannot appear on the RHS of any rule without causing there to be a cyclic relationship. Thus all of the additional qualification done in Step 5 will be undone. The rule grouping will be reverted to look like:

Model #1:
MKT1 O ALL,
MKT2 O ALL,
ENG1 S MKT1,
ENG1 N MKT2,
ENG2 S MKT2,
ENG2 O MKT1,
SER1 S ENG1+ENG2

Model #2:
MKT1 O ALL,
MKT2 O ALL,
ENG1 S MKT1,
ENG1 N MKT2,
ENG2 N MKT1,
ENG2 S MKT2
SER2 S ENG1+ENG2

Step 7 (1007): Build a DAG from the Qualified Rules

Building a DAG from the qualified rules results in the same DAG constructed in Step 2.

MKT →[ ]
ENG →[MKT]
SER →[ENG]

Step 8 (1008): Split the Rules into Those with a LHS Feature from a Trivial Family and Those with a LHS Feature from a Non-Trivial Family Since all of the families in this example are non-trivial families, splitting the rules into two groups yields only one set of rules, the set of rules with a LHS feature from a non-trivial family. All rules must go through the non-trivial combination algorithm.

Step 9.1 (1101): Group all of the Rules Together by LHS Feature

The result of grouping all of the rules by the LHS feature is shown below. In order to keep track of which model a rule originated in, (1) or a (2) is appended to the end of the rule.

MKT1→[MKT1 O ALL (1), MKT1 O ALL (2)]
MKT2→[MKT2 O ALL (1), MKT2 O ALL (2)]
ENG1→[ENG1 S MKT1 (1), ENG1 N MKT2 (1), ENG1 S MKT1 (2), ENG1 N MKT2 (2)]
ENG2→[ENG2 O MKT1 (1), ENG2 S MKT2 (1), ENG2 N MKT1 (2), ENG2 S MKT2 (2)]
SER1→[SER1 S ENG1+ENG2 (1)]
SER2→[SER2 S ENG1+ENG2 (2)]

Step 9.2 (1102): Determine all possible sets of rules with overlapping RHS features Calculating all possible sets of rules with overlapping RHS features results in the following sets for each LHS feature:

[{MKT1 O ALL (1), MKT1 O ALL (2)},
{MKT2 O ALL (1), MKT2 O ALL (2)},
{ENG1 S MKT1 (1), ENG1 S MKT1 (2)},
{ENG1 N MKT2 (1), ENG1 N MKT2 (2)},
{ENG2 O MKT1 (1), ENG2 N MKT1 (2)},
{ENG2 S MKT2 (1), ENG2 S MKT2 (2)}]

Step 9.3 (1103): Check for Optionality Overlap

Each group of rules is checked for sets of non-marker rules that have different optionalities. In this example there are no rules with optionality overlap.

Step 9.4 (1104): Check for Unspecified Buildables

In this example, there is one set of rules with unspecified buildables. It is as follows:

{ENG2 O MKT1 (1), ENG2 N MKT1 (2)}

This set has an unspecified buildable because it contains both marker and non-marker rules. This unspecified buildable is illustrated in Element 832. It is the result of adding Elements 606 to 616.

Step 9.5 (1105): Resolve Unspecified Buildables

This set of rules with an unspecified buildable will generate one restriction rule. The restriction rule generated is:

SER2 R ENG2.MKT1

Next the restriction rule is intersected with a temporary rule with SER2 on the RHS since the marker rule that caused the restriction to be generated came from Model #2 and SER2 is Model #2's distinguishing constraint. The results of the intersection leaves the restriction rule unchanged.

This generated restriction rule repairs the unspecified buildable in Element 832 by preventing it from happening in the SER family. The restriction written adjusts the SER space from Element 618 to Element 828.

Step 9.6 (1106): Optionally Apply Restriction Rules

The restriction generated can be applied to the rules by subtracting it from all rules that have the same LHS feature. In this example the only rule with the same LHS feature is:

SER2 S ENG1+ENG2

After performing the subtraction, the resulting rules with a LHS of SER2 are:

SER2 S ENG1
SER2 S ENG2.MKT2

These SER2 rules cover the space illustrated in FIG. 828.

Step 10 (1010): Combine rules together removing duplicate and marker rules

Finally the set of rules that were processed through the non-trivial combination algorithm can be combined with those that were processed through the trivial combination algorithm. In this example there were no trivial families so all rules were processed through the non-trivial algorithm. The resulting set of rules is:

MKT1 O ALL
MKT1 O ALL
MKT2 O ALL
MKT2 O ALL
ENG1 S MKT1
ENG1 S MKT1
ENG2 O MKT1
ENG2 S MKT2
ENG2 S MKT2
SER1 S ENG1+ENG2
SER2 S ENG1
SER2 S ENG2.MKT2

These rules correspond exactly to FIGS. 924, 926, and 928.

Figure 12:
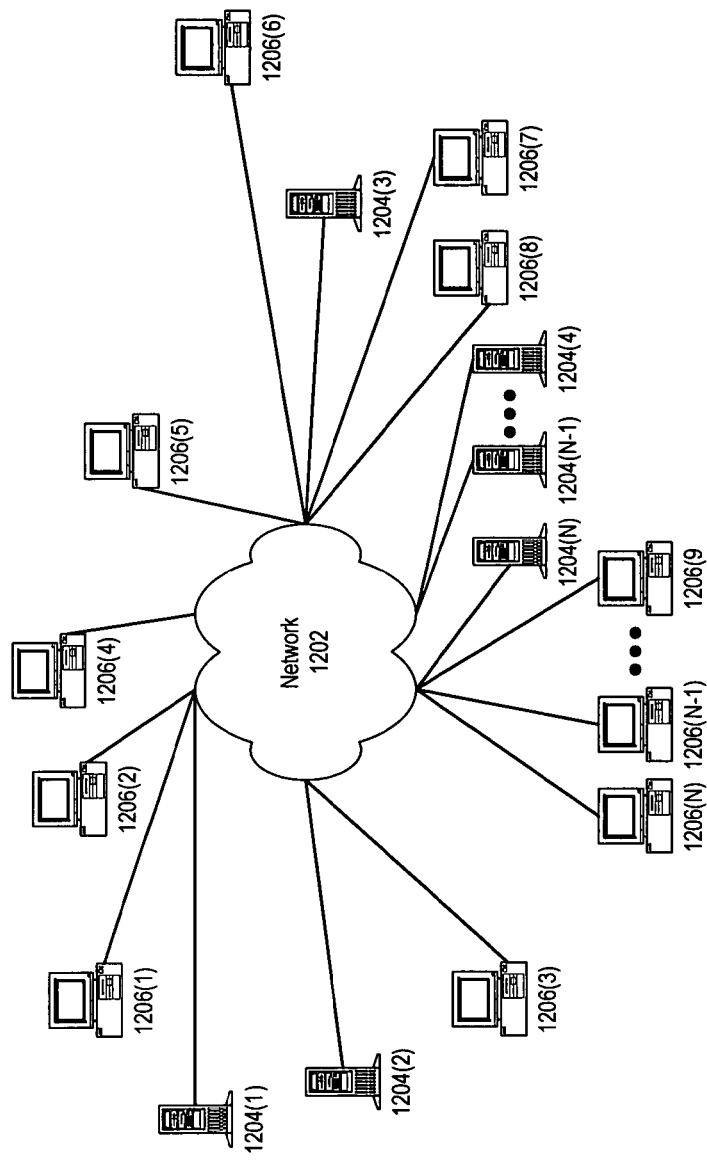
FIG. 12 depicts a network of computer systems in which a model consolidation system can be used.

FIG. 12 is a block diagram illustrating a network environment in which a model consolidation system 700 may be practiced. Network 1202 (e.g. a private wide area network (WAN) or the Internet) includes a number of networked server computer systems 1204(1)-(N) that are accessible by client computer systems 1206(1)-(N), where N is the number of server computer systems connected to the network. Communication between client computer systems 1206(1)-(N) and server computer systems 1204(1)-(N) typically occurs over a network, such as a public switched telephone network over asynchronous digital subscriber line (ADSL) telephone lines or high-bandwidth trunks, for example communications channels providing T1 or OC3 service. Client computer systems 1206(1)-(N) typically access server computer systems 1204(1)-(N) through a service provider, such as an internet service provider ("ISP") by executing application specific software, commonly referred to as a browser, on one of client computer systems 1206(1)-(N).

Client computer systems 1206(1)-(N) and/or server computer systems 1204(1)-(N) may be, for example, computer systems of any appropriate design, including a mainframe, a mini-computer, a personal computer system including notebook computers, a wireless, mobile computing device (including personal digital assistants). These computer systems are typically information handling systems, which are designed to provide computing power to one or more users, either locally or remotely. Such a computer system may also include one or a plurality of input/output ("I/O") devices coupled to the system processor to perform specialized functions. Mass storage devices such as hard disks, compact disk ("CD") drives, digital versatile disk ("DVD") drives, and magneto-optical drives may also be provided, either as an integrated or peripheral device. One such example computer system is shown in detail in FIG. 13.

Embodiments of the model consolidation system 700 can be implemented on a computer system such as a general-purpose computer 1300 illustrated in FIG. 13. Input user device(s) 1310, such as a keyboard and/or mouse, are coupled to a bi-directional system bus 1318. The input user device(s) 1310 are for introducing user input to the computer system and communicating that user input to processor 1313. The computer system of FIG. 13 generally also includes a video memory 1314, main memory 1315 and mass storage 1309, all coupled to bi-directional system bus 1318 along with input user device(s) 1310 and processor 1313. The mass storage 1309 may include both fixed and removable media, such as other available mass storage technology. Bus 1318 may contain, for example, 32 address lines for addressing video memory 1314 or main memory 1315. The system bus 1318 also includes, for example, an n-bit data bus for transferring DATA between and among the components, such as CPU 1309, main memory 1315, video memory 1314 and mass storage 1309, where "n" is, for example, 32 or 64. Alternatively, multiplex data/address lines may be used instead of separate data and address lines.

I/O device(s) 1319 may provide connections to peripheral devices, such as a printer, and may also provide a direct connection to a remote server computer system(s) via a telephone link or to the Internet via an ISP. I/O device(s) 1319 may also include a network interface device to provide a direct connection to a remote server computer system(s) via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 1309 until loaded into main memory 1315 for execution. Computer programs may also be in the form of electronic signals modulated in accordance with the computer program and data communication technology when transferred via a network. The method and functions relating to model consolidation system 700 may be implemented in a computer program alone or in conjunction with model consolidation system 700.

The processor 1313, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 1315 is comprised of dynamic random access memory (DRAM). Video memory 1314 is a dual-ported video random access memory. One port of the video memory 1314 is coupled to video amplifier 1316. The video amplifier 1316 is used to drive the display 1317. Video amplifier 1316 is well known in the art and may be implemented by any suitable means. This circuitry converts pixel DATA stored in video memory 1314 to a raster signal suitable for use by display 1317. Display 1317 is a type of monitor suitable for displaying graphic images.

The computer system described above is for purposes of example only. The model consolidation system 700 may be implemented in any type of computer system or programming or processing environment. It is contemplated that the model consolidation system 700 might be run on a standalone computer system, such as the one described above. The model consolidation system 700 might also be run from a server computer systems system that can be accessed by a plurality of client computer systems interconnected over an intranet network. Finally, the model consolidation system 700 may be run from a server computer system that is accessible to clients over the Internet.

Many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it should be understood that various changes, substitutions and alterations can be made hereto without departing from the spirit and scope of the invention as defined by the appended claims.

What is claimed is:

1. A method of consolidating multiple models of configurations of a product, wherein each model comprises rules that define a non-cyclic chain of dependencies among families and features of families and include at least one rule having a constraint that references a non-ancestral family to the constraint, the method comprising:

executing code, stored in a memory, by a processor of a computer system to configure the computer system into a machine that performs:

combining at least two of the models into a single, consolidated model that maintains the non-cyclic chain of dependencies among families and features of families, wherein each of the at least two models define multiple buildable configurations of the product;

detecting any unspecified buildable configurations of the product in the consolidated model, wherein an unspecified buildable configuration is a buildable configuration of the product that is specified in the consolidated model but not defined in the at least two configuration models;

automatically resolving any detected unspecified buildable configurations in the consolidated model so that the unspecified buildable configurations are removed from the consolidation model; and generating buildable configurations of the product using the consolidated model without generating any unspecified buildable configurations of the product.

2. The method of claim 1 wherein combining the at least two of the models into the consolidated model yields a non-cyclic chain of dependencies among families and features of families in the consolidated model.

3. The method of claim 1 wherein the code is further executable to perform:
identifying a conflict between at least two of the models; and
resolving the conflict in the consolidated model.

4. The method of claim 1 wherein the models represent models of configurable vehicles.

5. The method of claim 1 wherein the consolidated model includes only buildable configurations.

6. The method of claim 1 a first model of the models is a marketing model and a second model of the models is an engineering model.

7. The method of claim 1 wherein the product comprises a vehicle.

8. The method of claim 1 wherein the models are organized in accordance with respective directed acyclic graphs, each model includes at least one ancestor model family space and a child model family space below the ancestor model family space, a first of the conflicting models comprises an ancestor model family space that is different than an ancestor model family space of a second of the conflicting model, and each child model family space constrains the ancestor model family space above the child in accordance with configuration rules of the model to which the child belongs.

9. The method of claim 1 wherein each model includes at least one ancestor model family space and a child model family space below the ancestor model family space and automatically resolving any detected unspecified buildable configurations in the consolidated model so that the unspecified buildable configurations are removed from the consolidation model, wherein the code is further executable to perform:
applying an ancestor model family extending algorithm and a child model family space removal algorithm to remove unspecified buildable configurations; and
after applying the extending and removal algorithms, combining the first and second models into a single, consolidated model that maintains a non-cyclic chain of dependencies among families and features of families for use in answering configuration questions related to the product.

10. A method of providing consolidating multiple models of configurations of a product, wherein each model comprises rules that define a non-cyclic chain of dependencies among families and features of families and include at least one rule having a constraint that references a non-ancestral family to the constraint the method comprising:
transmitting from a first computer system to a second computer system software that consolidates multiple models of configurations of a product, wherein the software includes instructions, stored in a memory that when executed by a processor configures a third computer system into a machine for:
combining at least two of the models into a single, consolidated model that maintains the non-cyclic chain of dependencies among families and features of families, wherein each of the at least two models define multiple buildable configurations of the product;
detecting any unspecified buildable configurations of the product in the consolidated model, wherein an unspecified buildable configuration is a buildable configuration of the product that is specified in the consolidated model but not defined in the at least two configuration models;
automatically resolving any detected unspecified buildable configurations in the consolidated model so that the unspecified buildable configurations are removed from the consolidation model; and
generating buildable configurations of the product using the consolidated model without generating any unspecified buildable configurations of the product.

11. The method of claim 10 wherein the second computer system is the third computer system.

12. The method of claim 10 wherein combining the at least two of the models into the consolidated model yields a non-cyclic chain of dependencies among families and features of families in the consolidated model.

13. The method of claim 10 wherein the code is further executable to perform:
identifying a conflict between at least two of the models; and
resolving the conflict in the consolidated model.

14. The method of claim 10 wherein the models represent models of configurable vehicles.

15. The method of claim 10 wherein the consolidated model includes only buildable configurations.

16. The method of claim 10 a first model of the models is a marketing model and a second model of the models is an engineering model.

17. The method of claim 10 wherein the models are organized in accordance with respective directed acyclic graphs, each model includes at least one ancestor model family space and a child model family space below the ancestor model family space, a first of the conflicting models comprises an ancestor model family space that is different than an ancestor model family space of a second of the conflicting model, and each child model family space constrains the ancestor model family space above the child in accordance with configuration rules of the model to which the child belongs.

18. The method of claim 10 wherein each model includes at least one ancestor model family space and a child model family space below the ancestor model family space and automatically resolving any detected unspecified buildable configurations in the consolidated model so that the unspecified buildable configurations are removed from the consolidation model, wherein the code is further executable to perform:
applying an ancestor model family extending algorithm and a child model family space removal algorithm to remove unspecified buildable configurations; and
after applying the extending and removal algorithms, combining the first and second models into a single, consolidated model that maintains a non-cyclic chain of dependencies among families and features of families for use in answering configuration questions related to the product.

19. The method of claim 10 wherein the product comprises a vehicle.

* * * * *